Oct. 9, 1951 L. E. ALBERTSON 2,571,000
WATER SOFTENING SYSTEM AND APPARATUS
Filed May 1, 1948 5 Sheets-Sheet 1

INVENTOR
LAWRENCE E. ALBERTSON
BY
*G. H. Braddock*
ATTORNEY

Oct. 9, 1951     L. E. ALBERTSON     2,571,000
WATER SOFTENING SYSTEM AND APPARATUS
Filed May 1, 1948     5 Sheets-Sheet 4

INVENTOR
LAWRENCE E. ALBERTSON
BY
*G. H. Braddock*
ATTORNEY

Oct. 9, 1951     L. E. ALBERTSON     2,571,000
WATER SOFTENING SYSTEM AND APPARATUS Filed May 1, 1948     5 Sheets-Sheet 5

INVENTOR
LAWRENCE E. ALBERTSON
BY
G. H. Braddock
ATTORNEY

Patented Oct. 9, 1951

2,571,000

UNITED STATES PATENT OFFICE 2,571,000

WATER SOFTENING SYSTEM AND APPARATUS

Lawrence E. Albertson, St. Paul, Minn., assignor to The McKays Company, St. Paul, Minn., a corporation of Delaware Application May 1, 1948, Serial No. 24,470

15 Claims. (Cl. 210—24)

This invention has relation to a water softening system and apparatus.

An object of the invention is to provide a water softening system and apparatus which will be of new and improved construction.

A further object is to provide a water softening system and apparatus wherein will be incorporated desirable and improved features and characteristics novel both as individual entities of the water softening system and apparatus and in combination with each other.

A further object is to provide in a water softener, a new and improved construction and arrangement including a valve mechanism adapted to be manually actuated to be set to accomplish each of backwashing, salting or brining and rinsing operations of each cycle of regeneration of zeolite of the water softener and time controlled to be reset to accomplish reversion of said water softener to its normal, water softening condition at the expiration of each rinsing operation.

A further object is to provide in a water softener, a new and improved construction and arrangement for adjustably controlling the rate of flow of water through zeolite of the water softener during the backwashing operation of any regenerating cycle.

A further object is to provide in a water softener, a new and improved construction and arrangement for adjustably controlling the rate of flow of water through zeolite of the water softener during the rinsing operation of any regenerating cycle.

And a further object is to provide a water softener constituted as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification.

With respect to the drawings and the numerals of reference thereon, a pipe 20 leads from a source (not shown) of water supply under pressure by a valve 21 and a pipe 22 to a water softening medium container 23, and a pipe 24 leads from said water softening medium container by said valve and a pipe 25 to locations of use, such as faucets (not shown) for water. Water to be softened enters at the upper portion of the container 23 and passes downwardly through a softening medium 26, usually zeolite, in said container which absorbs such constituents as calcium and magnesium from and releases sodium to the water. When the water softening medium or zeolite reaches its saturated state, it is regenerated by flushing with a salt brine solution.

A gravel supporting bed 27 for the softening medium or zeolite 26 is situated in the base of the container 23, and a usual distributor 28 in said gravel supporting bed is in communication with the pipe 24. The distributor 28 includes ports 29. The supporting bed may be of gravel, screens, cork, charcoal or other suitable filtering means.

A salt tank 30, useful in the accomplishment of regeneration of the softening medium or zeolite 26, is for containing brine 31 to be delivered to the softening medium container 23, in a manner to be set forth, when the mineral bed of zeolite of the water softener is to be regenerated. The upper portion of the salt tank, above the brine 31, will be open to the atmosphere. A closure member 32 on the container 23 will seal its interior from the atmosphere. A pipe 33 for conveying brine from the salt tank to the container 23 includes a vertical leg situated in and terminating near the bottom of said salt tank and a horizontal leg leading to and assembled with the valve 21. Manually actuable valve 34 in said pipe 33, between the salt tank and said valve, it normally closed.

The valve 21 includes a casing 35 secured to the pipes 20, 22, 24, 25, 33 and to a drain pipe 42. An element 43 of the valve 21, secured in watertight fashion, as at 44, up against a side wall 45 of said casing 35, provides, together with said side wall, a first chamber 46 which opens through the side wall 45, by way of a relatively large port 47, to a second chamber 48 of said casing 35.

The pipe 20 leads to the first chamber 46 by way of a port 50 through the side wall 45.

Figures 5, 6, 7, 8:
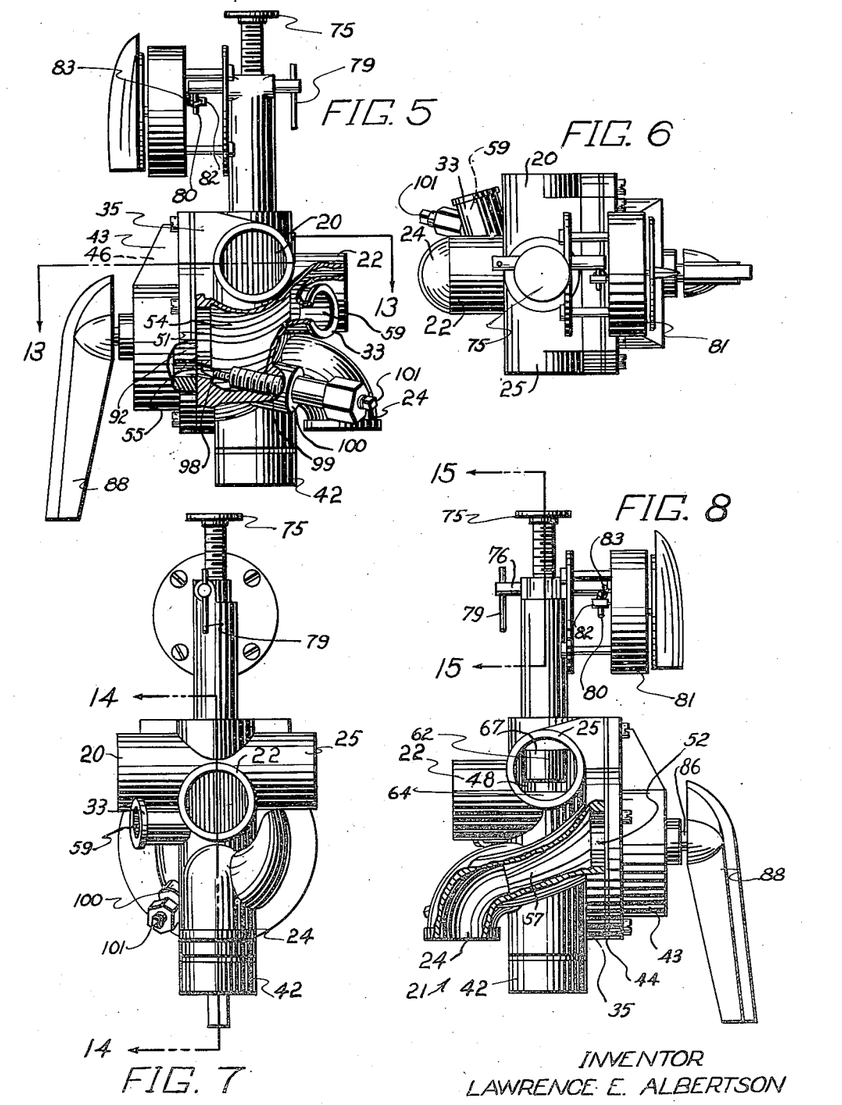
Fig. 5 is an elevational view, partially in section, of the disclosure of Fig. 4 as it would appear from the left side in said Fig. 4.
Fig. 6 is a top plan view of the valve mechanism with appurtenances disclosed in Figs. 4 and 5.
Fig. 7 is an elevational view of the disclosure of Fig. 5 as it would appear from the right in said Fig. 5.
Fig. 8 is an elevational view, partially in section, of the disclosure of Fig. 5 as it would appear from the reverse side in said Fig. 5.

Said side wall 45 includes arcuate ports denoted 51 and 52, respectively, at either side of the relatively large port 47. Pipe 22 leads to a passageway 54 which leads to arcuate port 51 and provides a passage from the pipe 22 to the first chamber 46. (See Fig. 5.) A comparatively small port 55 in the side wall 45, adjacent the arcuate port 51, communicatively connects said first chamber 46 and said passageway 54 with each other. A passageway 57 opens to the arcuate port 52 and the outlet pipe 24 to provide a passageway for flow of water between said outlet pipe 24 and the first chamber 46. (See Fig. 8.) Pipe 33 is open to the passageway 54. The drain pipe 42 is in direct communication with an end of the second chamber 48. The pipe 25 leads to a passageway 62 which leads to said second chamber 48 to provide for flow of water between said pipe 25 and said second chamber. The relatively large port 47 is in communication with the second chamber 48 at a location between the drain pipe 42 and the passageway 62.

A valve seat 63 is disposed in the lower portion of the second chamber 48, between the relatively large port 47 and the drain pipe 42, in surrounding relation to a port for affording communication between said relatively large port and the drain pipe.

A valve seat 64 is situated in an upper portion of said second chamber 48, between the relatively large port 47 and the passageway 62, in surrounding relation to a port for affording communication between relatively large port 47 and the pipe 25. The valve seat 64 is in vertical alinement with and parallel relation to valve seat 63.

A double valve 65 situated within the second chamber 48 is adapted to be reciprocated between the valve seats 63 and 64. A lower valve element 66 of the double valve 65 is adapted to be seated within and against the valve seat 63 to shut off communication between the relatively large port 47 and the drain pipe 42, and an upper valve element 67 of said double valve is adapted to be seated within and against the valve seat 64 to shut off communication between said relatively large port 47 and the passageway 62. The construction and arrangement are such that when the lower valve element 66 is in closed condition, the upper valve element 67 is in open condition, and vice versa.

A valve stem 68, rigid with the double valve 65, extends through the second chamber 48 and is slidably mounted in the valve 21. A compression coil spring 70 on the valve stem 68, between a collar 71 rigid with said valve stem and an annular flange 72 in said second chamber 48, exerts resilient tension adapted normally to retain the lower valve element 66 engaged with the lower valve seat 63 thus to cause the upper valve seat 67 to be in open condition.

The water softener incorporates a construction and arrangement, including a time controlled latching device, for retaining the upper valve element 67 of the double valve 65 engaged with the upper valve seat 64, against the action of the compression coil spring 70, when this is intentional, thus to cause the lower valve element 66 to be situated in spaced relation to the lower valve seat 63 below said lower valve seat in the disclosure as made.

A fitting 73, rigid with a portion of the valve 21 above the second chamber 48, includes a cylindrical guideway 74 in alined relation with the valve stem 68 which slidably and rotatably receives said valve stem. The free or outer end portion of the valve stem 68 projects beyond the fitting 73 and a hand piece 75 on said valve stem is for its manual actuation in any instance when desirable.

The fitting 73 also includes a hollowed out portion in contiguous relation to the cylindrical guideway 74 providing spaced apart bearings for trunnions of a rotatable latch element 76. Said rotatable latch element 76 is cut away at location between its trunnions to provide a latch edge 77 adapted to be releasably situated in an external thread 78 on the valve stem 68. The construction and arrangement will be such that the latch edge 77 has slant to the longitudinal axis of the rotatable latch element 76 to degree substantially equal to the pitch of the external thread 78 upon said valve stem 68, so that there will be snug engagement of said latch edge in said external thread no matter to what position the valve stem may be rotated in the fitting 73. The latch edge 77 has length somewhat greater than a measurement representing the diameter of the valve stem 68, and the construction and arrangement will be such that both of the trunnions of the latch element 76 are in spaced relation to the valve stem, at opposite sides thereof.

Actuating levers for the rotatable latch element 76 are represented 79 and 80, respectively. As disclosed, the actuating levers 79 and 80 are rigid with the trunnions of said rotatable latch element, and said actuating levers are at right angular relation to the rotatable latch element. The actuating lever 79 is for manual actuation of said latch element and the actuating lever 80 is for actuation of the latch element in a manner to be made plain.

A time operated controlling means for the latching device is constituted as clock mechanism 81. An actuator 82 controlled by said clock mechanism is adapted to be operated at the expiration of any length of time predetermined by setting of the clock mechanism to cause the actuating lever 80 to be tripped, thus to cause the latch element 76 to be rotated so that the latch edge 77 will be removed from the external thread 78 on the valve stem 68.

In practical operation, said valve stem 68 is pushed down, either manually or in a manner to be set forth, to cause the compression coil spring 70 to be compressed between the collar 71 and the annular flange 72, the lower valve element 66 of the double valve 65 to be moved to open condition and the upper valve element of said double valve to be moved to closed condition, and the rotatable latch element 76 causes its latch edge 77 to be engaged in the external thread 78 of the valve stem 68. Upon release of said valve stem 68 from the latch edge 77, the compression coil spring 70 will return the double valve 65 to its normal position of engagement with the lower valve seat 63. Said latch edge 77 will become removed from the external thread 78 upon said valve stem 68 in response to but slight rotative movement of the latch element 76 against resilient action of a tension spring 83 which normally retains the latch edge engaged with said external thread.

A rotatable disc valve 84 of the valve mechanism, situated in the first chamber 46, is rigidly supported at 85 on a crankshaft 86 rotatably and slidably mounted, as at 87, in the element 43 of the valve 21. The crankshaft 86 is situated centrally of and at right angular relation to the disc valve 84, and a portion of said crankshaft which projects outwardly of said element 43 rigidly supports a manipulating lever 88 for said rotatable disc valve. A compression coil spring 89, on the crankshaft 86 and between the disc valve 84 and the element 43, urges said disc valve into engagement with the adjacent flat surface of the side wall 45 of the casing 35 of the valve 21. See Fig. 14.

The rotatable disc valve 84 includes an elliptical concavity 90 in its interior surface always alined with the relatively large port 47 and adapted to be alined with the arcuate ports 51 and 52, and also includes a concavity 91, with which the elliptical concavity 90 is contiguous, adapted to be alined with said arcuate port 52.

Figure 1:
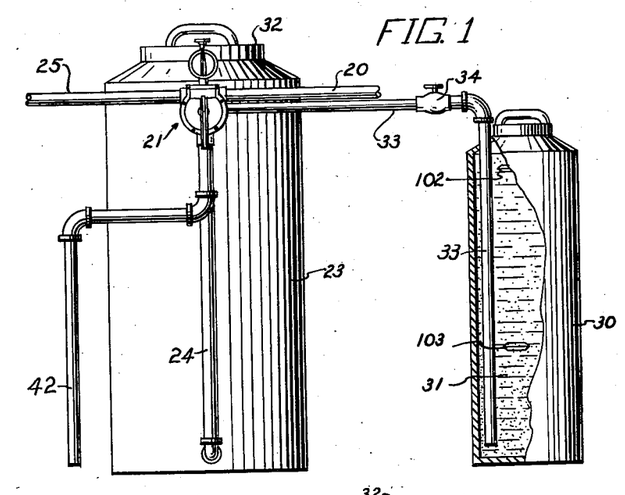
Fig. 1 is an elevational view, partially in section and partially broken away, of a water softener including the features and characteristics of the invention.
Figure 2:
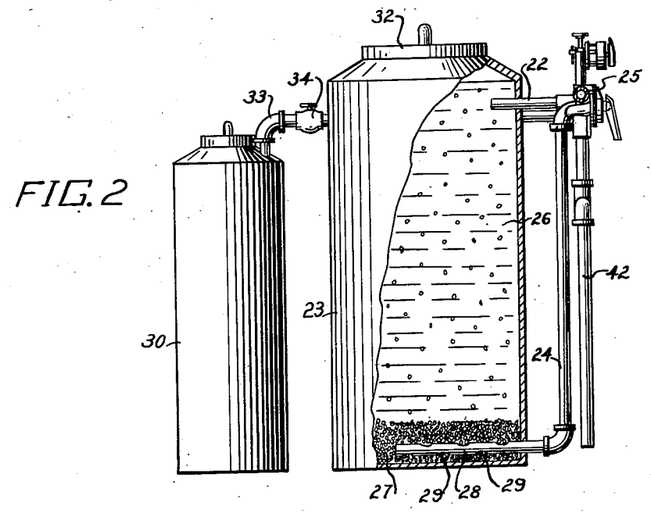
Fig. 2 is an elevational view, partially in section and partially broken away, of said water softener as it would appear from the left in Fig. 1.
Figures 3, 4:
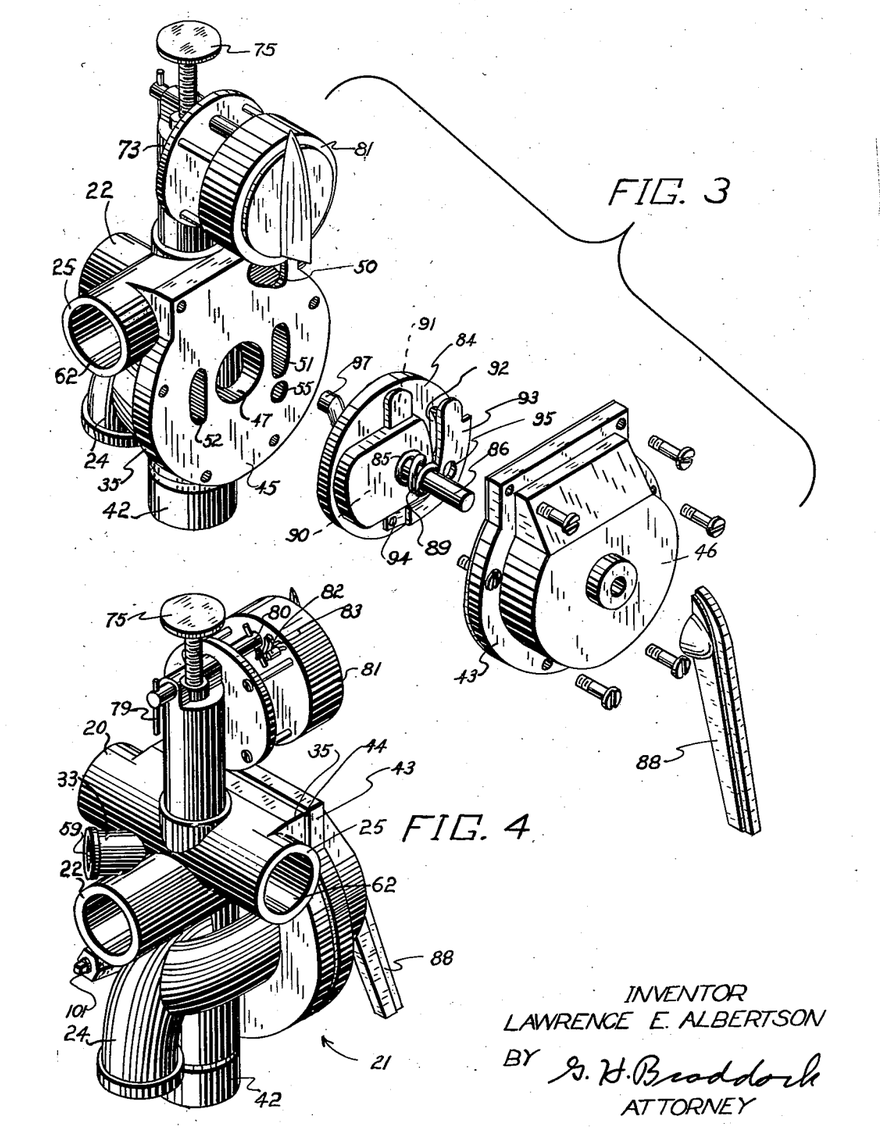
Fig. 3 is an enlarged exploded view of a valve mechanism with appurtenances of the water softener.
Fig. 4 is a perspective view of the valve mechanism with appurtenances shown in Fig. 3.

An arcuate slot 92 through the rotatable disc valve 84 is situated adjacent an end of the elliptical concavity 90 and at a side of the concavity 91, and a leaf spring 93 overlies said arcuate slot 92 and has one of its ends secured, as at 94, against the exterior surface of said rotatable disc valve. The leaf spring 93 has resiliency to be normally situated in spaced relation to the disc valve, as in Figs. 3, 13 and 14 of the drawings, and a pin 96 supported by the element 43 (Fig. 12) is adapted to retain said leaf spring 93 down against said disc valve, in seating relation to the arcuate slot 92, when the disc valve is approaching its position as in Fig. 11. Stated otherwise, the leaf spring 93 normally extends outwardly from the disc valve 84 in direction away from the location where said leaf spring is secured to said disc valve. A small port 95 through the leaf spring 93, situated in adjacent relation to the connected end of the leaf spring, is adapted to be alined with a port through the disc valve 84 adjacent the arcuate slot 92 and alined with the comparatively small port 55 through the side wall 45, and out of alinement with said arcuate slot 92 and the arcuate port 51, when the disc valve 84 is situated as in Fig. 11.

The rotatable disc valve 84 is situated in Figs. 5, 6, 13 and 14 as when the water softener is functioning in normal operation between regenerations. At this time, the first chamber 46 is open to the passageway 54 through the arcuate slot 92 and the arcuate port 51 is shut off from the relatively large port 47 and the arcuate port 52 by said disc valve 84. Also, the passageway 57 is open to the second chamber 48 through the arcuate port 52, the elliptical concavity 90 and the relatively large port 47, the passageway 62 is open, and the drain pipe 42 is closed.

Figure 9:
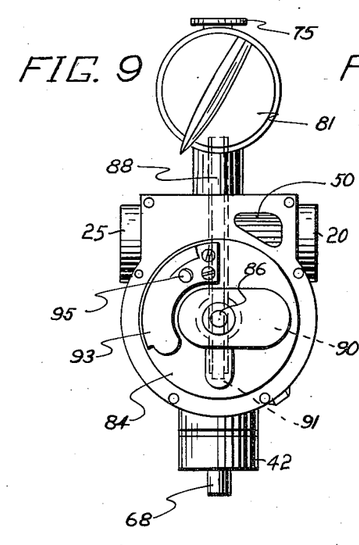
Fig. 9 is an elevational view of the valve mechanism with appurtenances as it would appear from the reverse side in Fig. 7 showing parts situated as when a backwashing operation is to be accomplished and other parts being removed.

The rotatable disc valve 84 is situated in Fig. 9 as when the backwashing operation of a regenerating cycle is occurring. At this time, the first chamber 46 is open to the passageway 57 through the arcuate slot 92 and the arcuate port 52 and is shut off from the relatively large port 47 and the arcuate port 51 by said disc valve 84. Also, the passageway 54 is open to the second chamber 48 through the arcuate port 51, the elliptical concavity 90 and the relatively large port 47, the passageway 62 is closed and the drain pipe 42 is open.

Figure 10:
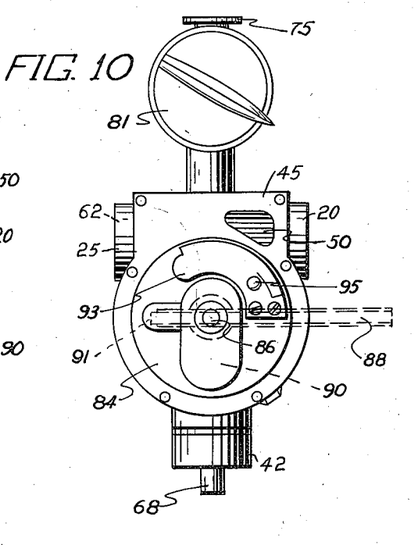
Fig. 10 is a view corresponding generally with the disclosure of Fig. 9 but showing parts situated as when a salting or brining operation is to be accomplished.

The rotatable disc valve 84 is situated in Fig. 10 as when the salting or brining operation of a regenerating cycle is occurring. At this time, the first chamber 46 is shut off from all of the ports 47, 51 and 52. Also, the passageway 57 is open to the second chamber 48 through the arcuate port 52, and the concavities 91 and 90 and the relatively large port 47, the passageway 62 is closed, and the drain pipe 42 is open.

Figure 11:
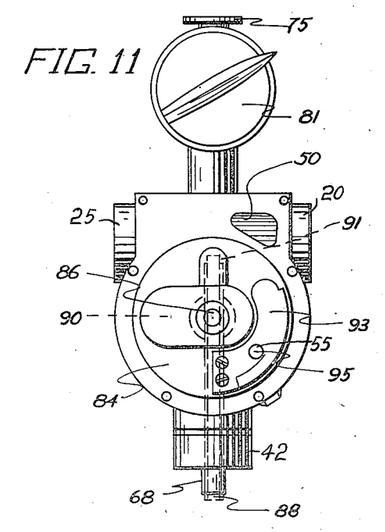
Fig. 11 is a view corresponding generally with the disclosures of Figs. 9 and 10 but showing parts situated as when a rinsing operation is to be accomplished.
Figure 12:
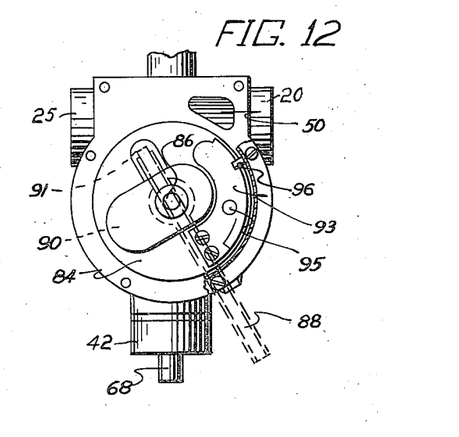
Fig. 12 is a fragmentary elevational view corresponding generally with the disclosures of Figs. 9, 10 and 11 and detailing the manner in which a pin of the valve mechanism is operative upon a leaf spring thereof.

The rotatable disc valve 84 is situated in Fig. 11 as when the rinsing operation of a regeneration cycle is occurring. At this time, the first chamber 46 is open to the passageway 54 through the small ports 95 and 55 and the port through the disc valve 84 adjacent the arcuate slot 92 and is shut off from the relatively large port 47 and the arcuate ports 51 and 52 by said disc valve 84. Also, the passageway 57 is open to the second chamber 48 through the arcuate port 52, the elliptical concavity 90 and the relatively large port 47, the passageway 62 is closed, and the drain pipe 42 is open.

Figures 13, 14, 15:
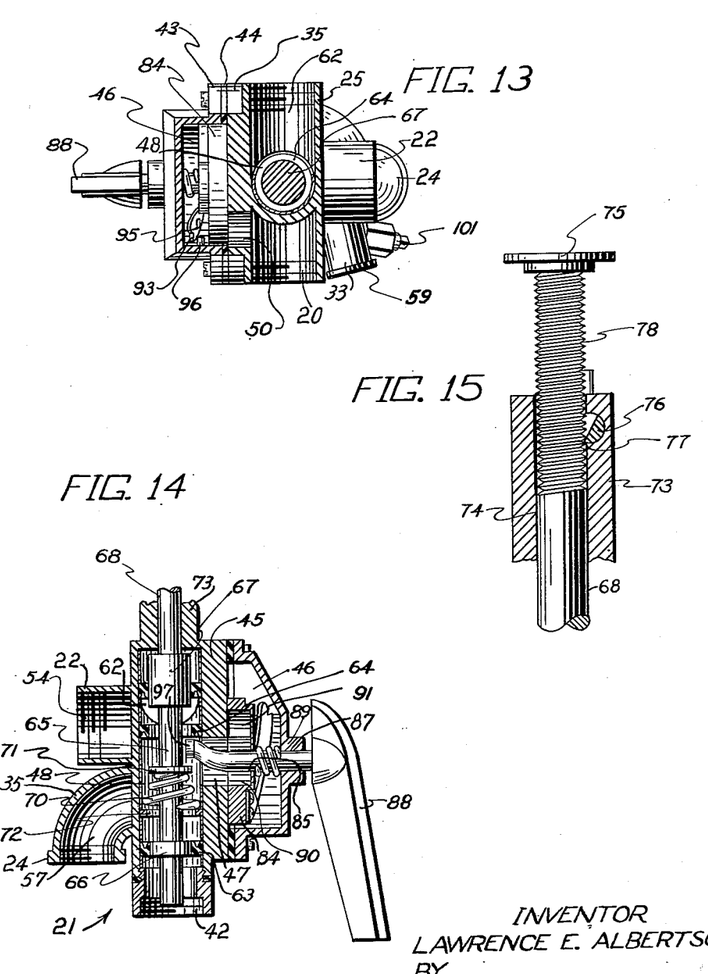
Fig. 13 is a detail sectional view, taken on line 13—13 in Fig. 5.
Fig. 14 is a detail sectional view, taken on line 14—14 in Fig. 7.
Fig. 15 is a detail sectional view, taken on line 15—15 in Fig. 8.

In Fig. 11, the leaf spring 93 is retained down against the adjacent surface of the disc valve 84 by differential in pressure between the inlet and outlet sides of the first chamber 46 existent by reason of the fact that the drain pipe 42 is open. In Figs. 13 and 14, said leaf spring is spaced from said casing. Differential in pressure between the inlet and outlet sides of the disc valve 84 causes the leaf spring 93 to remain in its position as in Fig. 11 after said leaf spring has been flexed down, as suggested in Fig. 12, until pressure in the water system has become equalized after the drain pipe has been closed and upon equalization of pressure at the opposite sides of said disc valve the leaf spring flexes to its normal, open position.

The crankshaft 86 includes a crank 97 at its interior end adapted to engage the collar 71 on the valve stem 68 in response to rotation of the manipulating lever 88 and cause the double valve 65 to be moved to open condition of the drain pipe 42 and the closed condition of the passageway 62.

When the water softener is operative between its periods of regeneration the double valve is positioned as in Fig. 14 so that the relatively large port 47 is open to the passageway 62 and shut off from the drain pipe 42. Said double valve is retained in the position just mentioned by the compression coil spring 70. When the water softener is in water softening operation the flow of water from the inlet pipe 20 is through the port 50, the first chamber 46, the ports 92 and 51, the passageway 54, pipe 22, downwardly through the zeolite bed, the pipe 24, the passageway 57, the second chamber 48 and the passageway 62 to the pipe 25.

When the softening medium or zeolite 26 is to be regenerated, the manipulating lever 88 is swung in clockwise direction through an arc of substantially 180 degrees, from its position as in Fig. 14 to its position as in Fig. 9 to begin backwashing. Before said manipulating lever is so swung, the clock mechanism will be set to remove the actuator 82 from the actuating lever 80. During backwashing the flow is from the inlet pipe 20 through the port 50, the first chamber 46, the arcuate port 52, the passageway 57, the pipe 24, upwardly through the zeolite bed, the pipe 22, the passageway 54 and the second chamber 48 to the drain pipe 42. With swinging movement of the manipulating lever from its position as in Fig. 14 to its position as in Fig. 9, the crank 97 will be situated at its lowermost position.

Upon completion of backwashing, the manipulating lever 88 is swung in clockwise direction through an arc of substantially 90 degrees, from its position as in Fig. 9 to its position as in Fig. 10, and the manually actuable valve 34 is opened. The salting or brining operation is accomplished by siphoning action, flow of salt brine solution from the salt tank 30 to the drain pipe 42 being through the pipe 33, the passageways 59, 54 and 22, downwardly through the zeolite bed, the pipe 24, the passageway 57, the arcuate port 52, the concavities 91 and 90, the second chamber 48 and the passageway 62. Siphoning action obviously will occur by reason of the fact that the container 23 is sealed closed by its closure member 32, the drain pipe 42 is open, and the upper portion of the salt tank 30 is open to atmosphere and at a level above that of the discharge outlet of the drain pipe. The salt brine solution thus made to flow into the zeolite container will cause the zeolite to be flushed and regenerated, and the manually actuable valve 34 will be closed after flushing and regeneration of the zeolite is completed. With swinging movement of the manipulating lever from its position as in Fig. 9 to its position as in Fig. 10, the crank 97 will be situated upwardly from and in spaced relation to the collar 71, but the double valve 65 will be retained in its depressed condition by the rotatable latch element.

After regeneration, it is necessary to wash the salt brine solution, and traces thereof, from the mineral bed. To accomplish this, the timing mechanism is set on the latching device, and the manipulating lever 88 is swung in clockwise direction through an arc of substantially 90 degrees, from its position as in Fig. 10 to its position as in Fig. 11. During such swinging movement of said manipulating lever, the pin 96 forces the leaf spring 92 down against the disc valve 84, and, even though said leaf spring is released from said pin before said disc valve 84 reaches its position as in Fig. 11, the leaf spring remains engaged against the disc valve until after the drain pipe 42 is shut off, the passageway 62 is opened and there is equalization of pressure in the water system. During rinsing the flow is from the inlet pipe 20 through the port 50, the first chamber 46, the small ports 95 and 55, the passageway 54, the pipe 22, downwardly through the zeolite bed, the pipe 24, the passageway 57, the arcuate port 52, the concavity 90, the relatively large port 47, the second chamber 48 and the passageway 62 to the drain pipe 42. With swinging movement of the manipulating lever from its position as in Fig. 10 to its position as in Fig. 11, the crank 97 will be situated at its uppermost position, as in Fig. 14, but the double valve 65 yet will be retained in its depressed position by the rotatable latch element. Actually, the parts of the valve mechanism are situated in Fig. 11 in the same positions as said parts are situated when the water softener is in water softening operation, except that in said Fig. 11 the drain pipe 42 is open, the passageway 62 is closed and the leaf spring 93 is retained down against the disc valve 84 by differential in water pressure existent at the inlet and outlet sides of said disc valve 84. It is necessary that washing of the zeolite be continued for an appreciable time to insure that all traces of salt brine be removed, and, desirably, the flow of water through the zeolite bed to the accomplishment of the rinsing or washing operation should be relatively slow thus to be thoroughly distributed throughout the zeolite bed. During rinsing, the flow from the first chamber 46 to the passageway 54 is limited to that which passes the small ports 95 and 55 so that proper washing of the zeolite bed will be accomplished.

Mechanism for adjusting the rate of flow of water in the system during the rinsing operation is constituted as a needle valve 98 for altering the size of the small port 55. As shown, said needle valve 98 is threadably supported in a threaded rod 99 itself suitably and conveniently adjustably mounted, as at 100, in the casing 35 of the valve 21. A projecting part 101 rigid with the needle valve 98 is for accomplishing its rotative adjustment toward and away from the small port 55. Clearly, the capacity for flow of water through said small port 55 will be increased with adjustment of the needle valve in direction away from the side wall 45 and will be decreased with adjustment of said needle valve in direction toward said side wall 45.

The construction and arrangement including the time controlled latching device before described is for retaining the upper valve element 67 in closed condition while the lower valve element 66 is in open condition and there is restricted flow through the ports 95 and 55 for a predetermined sufficient interval of time which will cause washing of the zeolite to be complete and for moving said upper valve element 67 to open condition and said lower valve element 66 to closed condition upon the expiration of said predetermined sufficient interval of time. Moving the upper valve element 67 to open condition and the lower valve element 66 to closed condition after washing of the zeolite is accomplished connects the relatively large port 47 with the passageway 62 and shuts off said relatively large port from the drain pipe 42. The clock mechanism of course will be set to cause the upper valve element 67 to remain in closed condition and the lower valve element 66 to remain in open condition for precisely the interval during which it is intended that washing of the zeolite bed be continued.

When the compression coil spring 70 causes the double valve 65 to be actuated to cause the pipe 20 to be shut off from drain and open to the pipe 25 leading to the locations of use, and thereafter pressure in the system becomes equal to head pressure in said inlet connection 20, the leaf spring 93 will become flexed to cause the port 51 to be opened, thus to permit free flow through the water softener until regeneration again is accomplished. Should a faucet on the line be open after regeneration is completed and before pressure in the system has equalized to permit the leaf spring 93 to uncover said port 51, flow from the faucet will be at the rate permitted by the small ports 95 and 55.

Inasmuch as the small ports 95 and 55 are at the inlet side of the double valve 65, pressure in the second chamber 48 is at a minimum while the rinsing operation is being accomplished so that there is no appreciable pressure in said second chamber which could be operative against actuation of said double valve.

The purpose for the inclusion of the construction and arrangement for accomplishing rinsing or washing of the zeolite bed for a predetermined sufficient interval of time and for causing the water softener to become automatically set or ready to be capable of commencing softening operation after rinsing or washing is completed is to relieve an operator of the necessity of waiting around until rinsing or washing of the zeolite bed has been accomplished. An operator need spend only a few minutes to the accomplishment of the backwashing and salting or brining operations and can be otherwise occupied during the much longer interval of time required for rinsing or washing.

Adjustable control of the flow of water through the zeolite bed of a water softener during the backwashing operation is a highly desirable feature for the reason that in the absence of such adjustable control, there could be washing of mineral from a softener container in installations where high pressures prevailed. Adjustment of rate of flow of water through the bed of zeolite 26 in the container 23 can be accomplished by rotatable adjustment of the manipulating lever 88. As hereinbefore stated, the parts of the valve mechanism of the water softener of the present application are situated in Fig. 9 of the drawings as when a backwashing operation is to be accomplished. At this time, the leaf spring 93 is in spaced relation to the arcuate slot 92 and said arcuate slot 92 is in registration with the arcuate port 52 which opens to the passageway 57. Evidently, the disc valve 84 can be rotatably manipulated by the lever 88 to cause the arcuate slot 92 to be in full alinement with said arcuate port 52 or partially alined with this arcuate port to any desired extent. When the arcuate slot 92 and the arcuate port 52 are completely alined, there will be flow through the zeolite bed at a maximum rate, and when said arcuate slot and said arcuate port are but partially alined, the rate of flow will be reduced. In short, the rate of flow of water through the zeolite bed 26 can be adjusted to have any predetermined value between zero and the maximum rate which the arcuate slot 92 and the arcuate port 52 when completely alined will permit, merely by rotational movement of the disc valve 84.

The salt tank 30 has upper and lower markers, indicated 102 and 103, respectively, for designating the level of salt brine solution. Before solution is withdrawn from said salt tank into the zeolite container, the level may be at the upper marker 102, and after solution is withdrawn, the level may be at the lower marker 103. Withdrawn solution can be replaced by water until the salt in the salt tank becomes dissipated, and when this occurs, the salt tank will need a new supply of salt.

Inasmuch as the inlet pipe 20 is shut off from the second chamber 48 and said second chamber is open to the drain pipe 42 when the salting or brining operation is to occur, the closure member 32 can be removed from the container 23 and solid salt, or salt brine solution, for accomplishing salting or brining can be placed directly into said container, instead of fed to the container from a salt tank such as 30. That is to say, a water softener made according to the invention need not necessarily include a salt tank such as 30 and appurtenances in an instance when it is preferred that solid salt or salt brine solution be placed in the container 23 by way of the opening which the member 32 normally seals closed. After solid salt or salt brine solution has been fed directly into said container 23 and said closure member 32 has been replaced, the solid salt or salt brine solution will be flushed through the bed of zeolite to drain during the rinsing operation.

It will be apparent from the drawings that the needle valve 98 constitutes readily accessible adjustable means for controlling the rate of flow through the zeolite bed when the rinsing or washing operation is occurring.

While the rotatable disc valve 84 controls flow of water and salt brine solution to the second chamber 48, flow of water to the pipe 25 is controlled by the upper valve element 67 of the double valve 65 and flow of water and salt brine solution to the drain pipe 42 is controlled by the lower valve element 66 of said double valve. Said upper and lower valve elements 67 and 66 are of the plug type, rather than of the sometimes objectionable disc type, and will effectively preclude the possibility of leakage to either locations of use for water or to drain. During all stages of each regenerating cycle the drain is wide open and the water and salt brine solution can flow freely and without restriction in the second chamber 48 to drain. Stated otherwise, there is not probability during any stage of regeneration that there could be travel of liquid past the upper valve element 67 to the pipe 25. Instead, the liquid will take the path of least resistance, which is to drain. The compression coil spring 70 of course will be of sufficient strength to retain the lower valve element 66 in the closed condition of the port which the lower valve seat 63 surrounds, as in Fig. 14 of the drawings, when the water softener is in softening operation.

What is claimed is:

1. In a water softener, the combination with a container having a bed of softening medium, an inlet connection to said container and bed adapted to lead from a source of water supply under pressure and an outlet connection from said container and bed adapted to lead to locations of use for water, of a valve providing a first chamber with which said inlet connection is in communication and said outlet connection is adapted to communicate and a second chamber with which said first chamber is adapted to communicate by way of a first port provided by said valve, a first pipe connection leading from a location of said second chamber at a side of said first port to said locations for use of water, a second pipe connection leading from a location of said second chamber at a side of said first port opposite said first pipe connection to drain, a first connection providing a passageway for flow of water between said first chamber and said container and bed by way of a second port provided by said valve, a second connection providing a passageway for flow of water between said outlet connection and said first chamber by way of a third port provided by said valve, there being a fourth port provided by said valve between said first chamber and said first connection, means adapted to be actuated selectively to shut off communication between said first chamber and said first connection and said first port and between said second chamber and said first pipe connection and establish communication by way of said second connection, said outlet connection, said first connection, said first port and said second chamber from the first chamber through said container with softening medium to drain or to shut off communication between said first chamber and said second and third ports and establish communication by way of said fourth port, said first connection, said outlet connection, said second connection, said first port and said second chamber from the first chamber through said container with softening medium to drain while said first pipe connection is shut off from said second chamber, said means including a device adapted to be retained in the closed condition of said second port when communication between the first chamber and the second and third ports is shut off and there is differential in pressure between the source and outlet sides of said first chamber adapted to be actuated to the open condition of said second port in response to equalization of pressure at said source and outlet sides of the first chamber, mechanism for actuating said means, and time controlled means for retaining said first pipe connection shut off from the second chamber and said drain open to said second chamber adapted to be actuated to cause the drain to be shut off from said second chamber and the first pipe connection to be open to the second chamber.

2. The combination as specified in claim 1, a tank for brine solution, a third connection providing a passageway between a lower portion of said brine solution tank and said first connection, and a manually actuable valve for controlling said third connection, said means adapted to be actuated selectively to shut off communication between said first chamber and said first connection and said first port or between the first chamber and said second and third ports also being adapted to be actuated selectively to shut off communication between said first chamber and said first and second connections and establish communication by way of said outlet connection, said second connection, said first port and said second chamber from the first connection through the container with softening medium to drain.

3. The combination as specified in claim 1 wherein the capacity for flow through said fourth port is less than through either of said second and third ports.

4. The combination as specified in claim 1, and means for adjustably controlling the rate of flow of water through said fourth port.

5. The combination as specified in claim 1, and means accessible at the outer side of said valve for adjustably controlling the rate of flow of water through said fourth port.

6. The combination as specified in claim 1, an element for adjustably controlling the rate of flow of water through said fourth port, and accessible means for adjusting said element.

7. The combination as specified in claim 1 wherein said means adapted to be actuated to shut off communication between said first chamber and said first connection and said first port and between said second chamber and said first pipe connection and establish communication by way of said second connection, said outlet connection, said first connection, said first port and said second chamber from the first chamber through said container with softening medium to drain also is adapted to be adjusted to controllably regulate the rate of flow of water through said second pipe connection.

8. The combination as specified in claim 1 wherein said means adapted to be actuated also is adapted to be adjusted to controllably regulate the flow of water through the second pipe connection when said just mentioned means is situated to cause communication between said first chamber and said first connection and said first port to be shut off and communication by way of said second connection, said outlet connection, said first connection, said first port and said second chamber from the first chamber through said container with softening medium to drain to be established.

9. In a water softener, the combination with a container having a bed of softening medium, an inlet connection to said container and bed adapted to lead from a source of water supply under pressure and an outlet connection from said container and bed adapted to lead to locations of use for water, of a valve providing a first chamber with which said inlet connection is in communication and said outlet connection is adapted to communicate and a second chamber with which said first chamber is adapted to communicate by way of a first port provided by said valve, a first pipe connection leading from a location of said second chamber at a side of said first port to said locations for use of water, a second pipe connection leading from a location of said second chamber at a side of said first port opposite said first pipe connection to drain, a first connection providing a passageway for flow of water between said first chamber and said container and bed by way of a second port provided by said valve, a second connection providing a passageway for flow of water between said outlet connection and said first chamber by way of a third port provided by said valve, there being a fourth port provided by said valve between said first chamber and said first connection, means adapted to be actuated to shut off communication between said first chamber and said second and third ports and establish communication by way of said fourth port, said first connection, said outlet connection, said second connection, said first port and said second chamber from the first chamber through said container with softening medium to drain while said first pipe connection is shut off from said second chamber, said means including a device adapted to be retained in the closed condition of said second port when communication between the first chamber and the second and third ports is shut off and there is differential in pressure between the source and outlet sides of said first chamber adapted to be actuated to the open condition of said second port in response to equalization of pressure at said source and outlet sides of said first chamber, mechanism for actuating said means, and time controlled means for retaining said first pipe connection shut off from the second chamber and said drain open to said second chamber adapted to be actuated to cause the drain to be shut off from said second chamber and the first pipe connection to be open to the second chamber upon the expiration of a predetermined interval of time after said means adapted to be actuated has been situated to shut off communication between said first chamber and said second and third ports and establish communication from said first chamber through said container with softening medium to drain.

10. The combination as specified in claim 9 wherein the capacity for flow through said fourth port is less than through either of said second and third ports.

11. The combination as specified in claim 9, and means for adjustably controlling the rate of flow of water through said fourth port.

12. The combination as specified in claim 9, an element for adjustably controlling the rate of flow of water through said fourth port, and accessible means for adjusting said element.

13. In a water softener, the combination with a container having a bed of softening medium, an inlet connection to said container and bed adapted to lead from a source of water supply under pressure and an outlet connection from said container and bed adapted to lead to locations of use for water, of a valve providing a first chamber with which said inlet connection is in communication and said outlet connection is adapted to communicate and a second chamber with which said first chamber is adapted to communicate by way of a first port provided by said valve, a first pipe connection leading from a location of said second chamber at a side of said first port to said locations for use of water, a second pipe connection leading from a location of said second chamber at a side of said first port opposite said first pipe connection to drain, a first connection providing a passageway for flow of water between said first chamber and said container and bed by way of a second port provided by said valve, a second connection providing a passageway for flow of water between said outlet connection and said first chamber by way of a third port provided by said valve, means adapted to be actuated to shut off communication between said first chamber and said first connection and said first port and between said second chamber and said first pipe connection and establish communication by way of said second connection, said outlet connection, said first connection, said first port and said second chamber from the first chamber through said container with softening medium to drain, and mechanism for actuating said means adapted to be adjusted to controllably regulate the rate of flow of water through said second pipe connection when the means is situated to cause communication between said first chamber and said first connection and said first port to be shut off and communication by way of said second connection, said outlet connection, said first connection, said first port and said second chamber from the first chamber through said container with softening medium to drain to be established.

14. In a water softener, a valve casing providing a first chamber with which an inlet connection from a source of supply of water under pressure is adapted to communicate and a second chamber with which the first chamber is adapted to communicate by way of a first port provided by said valve casing, a first outlet duct leading from said second chamber at a side of said first port, a second outlet duct leading from said second chamber at a side of said first port opposite said first outlet duct, a first connection open to said first chamber by way of a second port provided by said valve casing, a second connection open to said first chamber by way of a third port provided by said valve casing, there being a fourth port provided by the valve casing between said first chamber and said first connection, and said first and second connections being adapted to be open to each other exteriorly of said valve casing, a double valve in said second chamber adapted to be manually actuated to cause said first outlet duct to be closed and said second outlet duct to be open and time controlled to cause the first outlet duct to be opened and the second outlet duct to be closed, a rotatable valve in said first chamber adapted to be manually actuated selectively to shut off said first chamber from said first and second connections and establish communication between said first connection and said second chamber by way of said third and first ports or to shut off said first chamber from said second and third ports and establish communication between said first chamber and said second chamber by way of said fourth port, said first connection, said second connection and said first port, said rotatable valve including a resilient device adapted to be retained in the closed condition of said second port when communication between the first chamber and the second and third ports is shut off and there is differential in pressure between the source and outlet sides of said first chamber adapted to be actuated to the open condition of said second port in response to equalization of pressure at said source and outlet sides of the first chamber, and unitary means for accomplishing manual actuation of both said double valve and said rotatable valve.

15. The combination as specified in claim 14, and said rotatable valve also being adapted to be manually actuated selectively to shut off said first chamber from said first connection and said first port and establish communication between said first chamber and said second chamber by way of said third port, said second connection, said first connection and said second and first ports.

LAWRENCE E. ALBERTSON.

REFERENCES CITED

The following references are of record in the file of this patent:

UNITED STATES PATENTS

| Number | Name | Date |
|---|---|---|
| 1,620,717 | Brice | Mar. 15, 1927 |
| 1,661,675 | Norquist | Mar. 6, 1928 |
| 1,743,026 | Daniels | Jan. 7, 1930 |
| 1,749,622 | Yount | Mar. 4, 1930 |
| 1,831,656 | Eisenhauer | Nov. 10, 1931 |
| 1,910,004 | De Ville | May 23, 1933 |
| 2,082,623 | Gauss | June 1, 1937 |
| 2,137,406 | Johnson | Nov. 22, 1938 |
| 2,245,767 | Eickmeyer | June 17, 1941 |
| 2,247,964 | Reynolds | July 1, 1941 |
| 2,309,032 | Zimmerman | Jan. 19, 1943 |
| 2,347,201 | Lindsay | Apr. 25, 1944 |